United States Patent [19]

Jessop

[11] 4,448,335

[45] May 15, 1984

[54] INCREMENTAL METERING DEVICE HAVING RESET MEANS

[75] Inventor: Thomas C. Jessop, Webster, N.Y.

[73] Assignee: Eastman Kodak Company, Rochester, N.Y.

[21] Appl. No.: 352,740

[22] Filed: Feb. 26, 1982

[51] Int. Cl.³ .............................................. G01F 11/00
[52] U.S. Cl. ................................. 222/391; 73/864.14; 73/864.16; 74/128; 74/531
[58] Field of Search ................... 222/309, 391, 41, 43, 222/47; 604/207, 208, 218, 228, 135; 73/864.14, 864.16, 864.18; 74/128, 531, 126, 129, 111

[56] References Cited

U.S. PATENT DOCUMENTS

| | | |
|---|---|---|
| 1,114,832 | 10/1914 | Whitney . |
| 1,760,860 | 5/1928 | Minnier et al. . |
| 2,228,244 | 3/1940 | Baker . |
| 2,523,568 | 5/1948 | Halverson . |
| 2,750,943 | 12/1954 | Dann . |
| 2,959,422 | 9/1957 | Manos . |
| 3,172,297 | 8/1962 | Thiene . |
| 3,215,320 | 11/1965 | Heisler .................. 222/391 |
| 3,248,950 | 5/1966 | Pursell .............................. 73/864.18 |
| 3,517,668 | 6/1970 | Brickson ......................... 222/391 X |
| 3,799,406 | 3/1974 | St. John et al. . |
| 3,975,032 | 8/1976 | Bent et al. . |
| 4,067,403 | 1/1978 | Richmond et al. . |
| 4,099,548 | 7/1978 | Sturm et al. ..................... 222/391 X |
| 4,257,267 | 3/1981 | Parsons . |

Primary Examiner—Joseph J. Rolla
Assistant Examiner—Kevin P. Shaver
Attorney, Agent, or Firm—Dana M. Schmidt

[57] ABSTRACT

There is disclosed a metering device having a mechanism for incrementally moving a piston rod in one direction only, until a reset mechanism is actuated to automatically return the piston rod to its initial position. A one-way locking device prevents the piston rod from returning before the reset mechanism is actuated. The device is constructed to meter liquid from a container supported relative to the piston rod.

10 Claims, 5 Drawing Figures

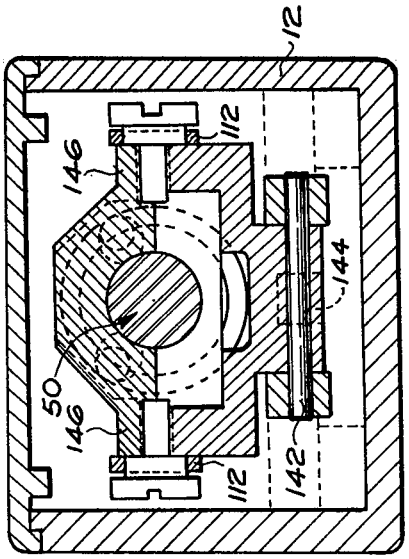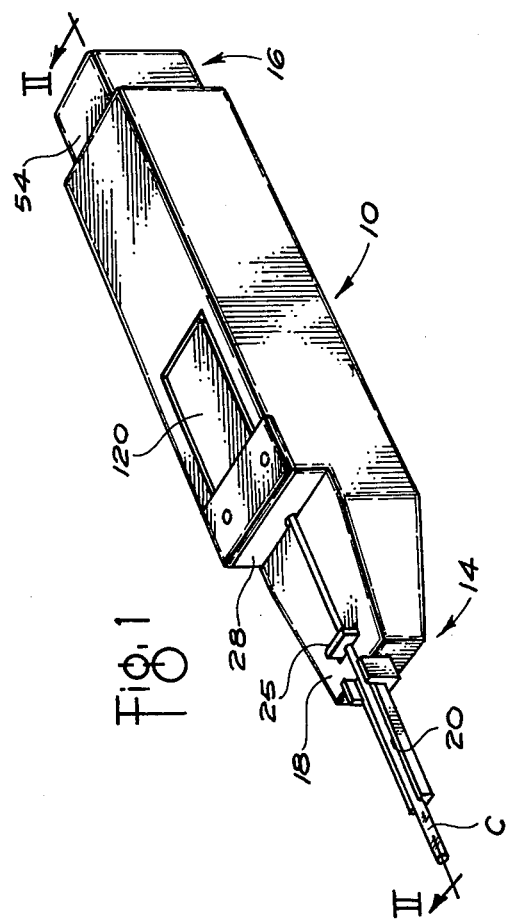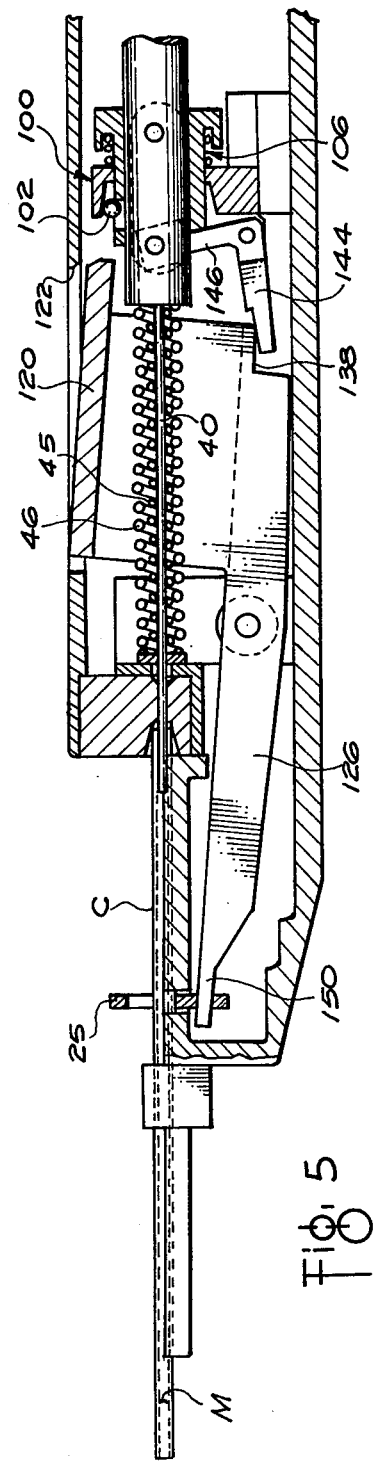

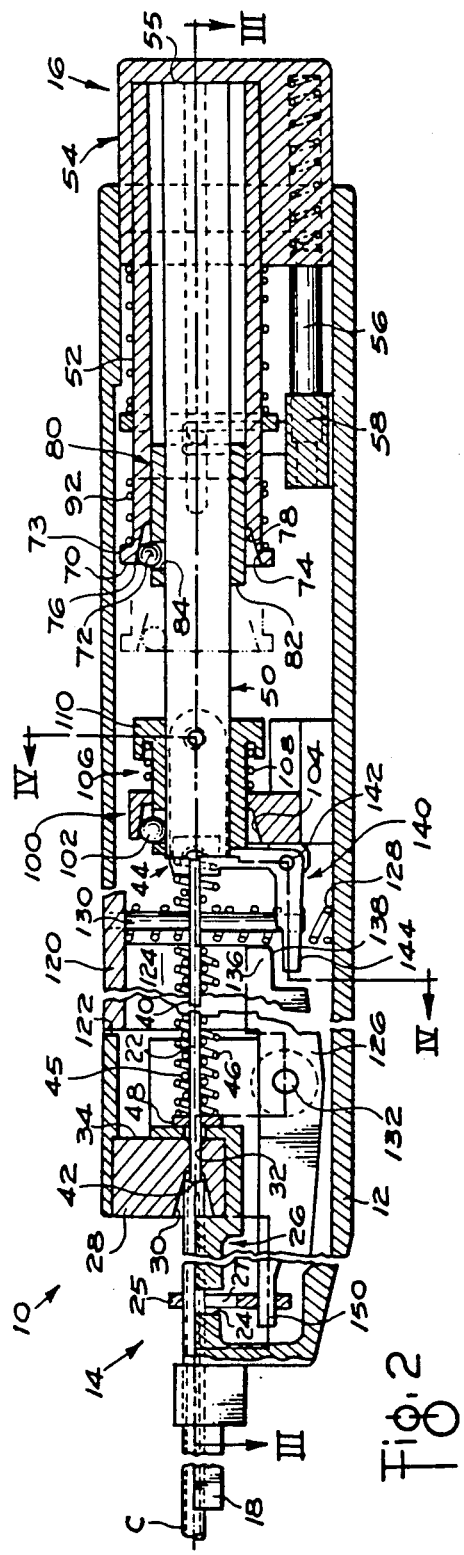

INCREMENTAL METERING DEVICE HAVING RESET MEANS

FIELD OF THE INVENTION

This invention relates to metering devices, such as pipettes, which permit the emptying of a container, for example, in incremental quantities.

BACKGROUND OF THE INVENTION

Apparatus has been developed to incrementally empty liquid-containing cylinders such as syringes. In one such apparatus, shown, for example, in U.S. Pat. No. 3,799,406, issued Mar. 26, 1974, a piston rod is incrementally advanced against a syringe. A one-way locking mechanism serves to connect a reciprocating actuator to the piston rod only during the advance of the actuator. A ball bearing is spring-biased against the piston rod to frictionally hold it in place at each incrementally-advanced position during the withdrawal movement of the reciprocating actuator.

The disadvantage, however, of such apparatus is that, because it has no means for automatically resetting the piston rod at the end of the cycle, resetting has to be done by hand. That is, when an unlocking sleeve is pushed against the locking mechanism, the piston rod has to be manually pulled against the ball bearing, to its initial position. Such a technique is inconvenient and cumbersome.

SUMMARY OF THE INVENTION

As a solution to the above-noted disadvantages, this invention provides a metering device comprising a piston rod, biasing means to urge the piston rod away from the container to be emptied, means for advancing the piston rod against the biasing means, locking means to prevent the biasing means from being operative, and reset means for overriding the locking means so that the biasing means is operative. As a result, the piston rod is automatically returned to its starting position.

More specifically, in accord with one aspect of the invention, there is provided a metering device for ejecting liquid from such containers, which includes a piston rod mounted for movement from an initial position in a direction toward the container for ejection of liquid, and away from the container in a reset direction toward the initial position, and first biasing means for biasing the piston rod away from the container back toward its initial position. The device further includes one-way locking means operative against the first biasing means for preventing substantially all movement of the piston rod away from the container under the influence of the biasing means, and reset means for releasing the one-way locking means whereby the piston rod is returned automatically to its starting position.

Thus, it is an advantage of the present invention that the piston rod of a device that meters liquid from a container, is automatically returned to its initial position when reset means are actuated.

It is a further advantage of such a device of the invention that substantially all return movement of the piston rod is automatically restrained during the metering, until the reset means is activated.

A related advantage of such a device is that retention of the piston rod in its advanced position during liquid metering is not contingent upon an operator holding the piston rod against the biasing means.

Other features and advantages will become apparent upon reference to the following Description of the Preferred Embodiments, when read in light of the attached drawings.

BRIEF DESCRIPTION OF THE DRAWINGS

FIG. 1 is a perspective view of the metering device constructed in accordance with the invention;

FIG. 2 is a fragmentary vertical section view taken generally along the line II—II of FIG. 1;

FIG. 3 is a fragmentary horizontal section view taken generally along the line III—III of FIG. 2, except that the capillary tube has been removed for clarity;

FIG. 4 is a section view taken generally along the line IV—IV of FIG. 2; and

FIG. 5 is a fragmentary section view similar to that of FIG. 2, but illustrating the operation of the resetting mechanism of the device.

DESCRIPTION OF THE PREFERRED EMBODIMENTS

The invention is hereinafter described in connection with a pipette for metering liquid from a container such as a capillary tube, that is, from a container the flow-through dimensions of which induce capillary flow of liquid. In addition, the invention is applicable to any device for metering liquid from any container. The size and shape of the piston rod and of the container support are adjusted for the particular container of choice.

A further aspect of the description which follows is the use of a piston rod that is moved into the capillary tube to eject the liquid. For example, a clay plug may close off one end of such a capillary tube, the plug being advanced by the piston rod along with the liquid during incremental advances of the piston rod within the tube. In addition, the invention is also applicable to a metering device wherein the piston rod is operative indirectly through a plunger, such as the plunger of a syringe, the plunger being the component that directly pushes against the liquid of the tube.

The preferred embodiments hereinafter discussed are described as metering blood serum from the container. In addition, the invention is applicable to the metering of other liquids.

As shown in FIGS. 1-3, a pipette 10 constructed in accordance with the invention comprises a generally hollow frame 12 having a front end 14 and a rear end 16. To eject serum from a capillary tube C, a piston rod 40 and its drive member 50 extend from end 14 to end 16 within frame 12, FIG. 2, centered on central axis 22 of the pipette. To incrementally and repetitively advance piston rod 40 farther out into end 14 from its position shown in FIG. 2, actuator button 54 is provided, together with wedging members 70 and 72 that lock the button to drive member 50, but only when the actuator advances towards drive member 50.

Considering first front end 14, it preferably includes a support 18 for capillary tube C, from which blood serum is to be metered. Support 18 is grooved at 20, FIG. 3, along the central axis 22 of pipette 10, to center tube C for engagement with the piston rod 40, discussed hereinafter. Support 18 is apertured at 24, FIG. 2, intermediate its ends, to accommodate a clamp 25 apertured at 27 that secures tube C to support 18.

Alternatively, pipette 10 lacks a support and instead tube C is held by a separate device, not shown, which properly aligns tube C with the pipette to insure proper fitting of the piston rod with respect to the tube. Such an arrangement is useful if the tube to be emptied is a syringe wherein the piston rod presses on the piston of the syringe.

Support 18 is joined at one end 26 thereof to a vertical plate 28. To assist in the proper seating of the tube C relative to the piston rod, plate 28 is provided with a frusto-conical seating aperture 30 extending part way into the plate from its exterior surface. A cylindrical aperture 32 extends from aperture 30 to the interior surface 34 of plate 28.

Piston rod 40 is mounted for movement along the path defined by axis 22. Rod 40 is provided with a forward end 42 adapted to snugly fit into one end of tube C, most preferably, the end containing a clay plug. An opposite end 44 of rod 40 is extended to form a drive member 50. To bias rod 40 to move along its path away from tube C, inner and outer compression springs 45 and 46 are mounted around rod 40 between drive member 50 and a spring washer 48.

Drive member 50 extends from rod 40 through a one-way locking mechanism 100 and 102, discussed hereinafter, and into a housing 52 that is secured to actuator button 54. Button 54 is mounted for telescoping reciprocation within frame 12 around drive member 50, along a path that is parallel to axis 22. As shown in FIGS. 2 and 3, button 54 initially abuts against rearward end 55 of member 50. To guide button 54 for reciprocation, a pair of guide pins 56, FIG. 3, are secured to frame 12 at a boss 58, FIG. 2. Button 54 is formed with matching apertures 60, FIG. 3, that provide a sliding fit around pins 56. To bias button 54 away from rod 40, a compression spring 62 is inserted into each aperture 60.

To lock drive member 50 to housing 52 and therefore to button 54, one-way wedging members 70 and 72 are provided within housing 52, FIG. 2. Member 70 is an annular portion of housing 52, having an external lip 73 and an internal frusto-conical surface 74 spaced far enough away from drive member 50 to accommodate member 72. Member 72 comprises at least one, and preferably several, balls. To allow balls 72 to alternately disengage drive member 50 and to wedge against the drive member, surface 74 is inclined to axis 22 so that, at one end 76 distal to button 54, balls 72 loosely fit between the annular portion and drive member 50. At the end 78 of surface 74 that is more proximal to button 54, surface 74 is spaced from member 50 a distance less than the balls' diameter. Preferably, frusto-conical surface 74 is inclined so that a plane tangent to the surface at any point on its circumference, intersects axis 22 and drive member 50 at an angle preferably between 3° and 20°. Angles greater than 20° may provide less than the desired wedging force. Angles less than 3° tend to lock the wedging members so tightly that they will not readily release when relative movements are reversed. Beyond surface 74, housing 52 is slotted at 77, FIG. 3, to receive ears 90 of ball-retaining collar 80.

Balls 72 are mounted within retaining cylindrical collar 80 that slidably fits on drive member 50, FIG. 2. One end 82 of collar 80 is provided with a slot 84 for the balls, and the opposite end 88 with ears 90, FIG. 3. A spring 92 is disposed between lip 73 and ears 90 to bias the balls 72 toward end 78, thereby encouraging members 70 and 72 to lock housing 52 against drive member 50, as described hereinafter under "Operation."

Stop pins 94 are provided so that when the button 54 and housing 52 are fully retracted, pins 94 push on collar 80 to move balls 72 away from the locking end 78 of surface 74. Pins 94 prevent the locking balls 72 from retarding the motion of drive member 50 when drive member 50 is reset by releasing wedging members 102, as is discussed hereinafter.

To lock drive member 50 to frame 12, thereby preventing substantially all undesired rearward movement of rod 40, a similar pair of wedging members 100 and 102 are provided along axis 22, between housing 50 and rod 40, FIG. 2. More specifically, member 100 comprises a fixed housing for member 102. Member 102 comprises one, and most preferably three, balls disposed between housing 100 and drive member 50. The internal surface of housing 100 facing drive member 50 is an inclined frusto-conical surface 104 similar to surface 74 of housing 52. Also similarly, balls 102 are mounted in a slotted cylindrical collar 106 biased by a spring 108 away from housing 100. Such bias acts to urge the forward portion of collar 106 rearwardly against balls 102, so as to urge such balls toward the locking position on surface 104. The spring constant for spring 108 is selected to place balls 102 in an incipient locking condition. Thus, any rearward force on rod 50 that tends to move the rod rearward, acts to immediately lock up balls 102 on surface 104 and drive member 50.

End 110 of collar 106, against which spring 108 abuts, FIG. 3, is secured to two links 112 on either side, to allow the unlocking of the wedging members 100 and 102 as hereinafter described.

It is not necessary, for the proper functioning of one-way locking members 70, 72 and 100, 102, that the angles of inclination of surfaces 74 and 104 be identical.

The spring constants for springs 92, 108 and all other springs herein described are dependent, in part, upon the size and weight of the members being biased. Their selection, therefore, is a design criteria within the understanding of one skilled in this art.

Operation of Locking Mechanisms

As will be apparent from the preceding description, a tube C secured to support 18 by clamp 25, centered within plate 28, can be incrementally emptied by the following procedure. When button 54 is pushed into frame 12, away from its rest position shown in solid lines, FIG. 2, its initial movement causes annular portion 70 to ride up over ball 72 so that the latter wedges against drive member 50. The spring constant for spring 92 is selected to insure that collar 80 is pushed away from lip 73 to cause wedging of balls 72 as button 54 advances toward rod 50. Button 54, member 50, and rod 40 thus advance until button 54 reaches fixed boss 58, or an adjustable stop surface, not shown. Wedging members 70 and 72 occupy at this time the position shown in phantom, FIG. 2. Rod 40 is caused to advance by substantially the same amount of advance of housing 52. An increment of liquid is thus ejected from tube C. When button 54 is released by the operator, springs 62, compressed by the forward motion of the button, return button 54, housing 52, and collar 80 to their initial positions shown as solid lines in FIGS. 2 and 3. (Collar 82 is coupled to housing 52 by spring 92 during this movement.) The force of springs 62 is selected to be sufficient to unlock locking members 70 and 72. Because drive member 50 does not return, as described hereinafter, balls 72 readily unwedge from surface 74.

As will be apparent, the initial advance of button 54, member 50 and rod 40 is controllable over a variable amount. Such a capability is important to accommodate the variation in location of meniscus M, FIG. 5, from tube to tube. That is, the meniscus is first moved to the dispensing end of the tube, by incrementally advancing button 54 the necessary distance, and then releasing button 54.

Springs 45 and 46, compressed during the forward movement of rod 40, exert a rearward force on rod 40 and member 50 when button 54 is released. However, this force causes balls 102 to substantially instantly wedge against fixed surface 104, thereby preventing substantially all rearward movement of rod 40 and drive member 50. Therefore, when button 54 is reciprocated again into frame 12, wedging members 70 and 72 again lock housing 52 to the drive member to further incrementally advance it and rod 40, in the manner described before. Wedging members 100 and 102 readily unlock for this purpose, since forward motion of drive member 50 causes balls 102 to unseat from surface 104 against the action of spring 108.

In such a fashion, rod 40 is incrementally advanced as often as is desired to meter one or more portions, or all, of the liquid. Rod 40 advances until springs 45 and 46 are fully compressed and/or until tube C is emptied. At this point, however, additional mechanisms are required to reset rod 40 to its initial position so that another tube C can be inserted into pipette 10.

Reset Mechanism

A reset button 120 is mounted so as to project out through an aperture 122 in frame 12, FIG. 2. Button 120 is connected by two flanges 124 that straddle axis 22, FIG. 3, to a rocker arm 126, FIG. 2. A compression spring 128, mounted on a guide pin 130, urges button 120 into the position shown in FIG. 2. Rocker arm 126 is journaled on a pin 132 mounted in frame 12.

At one end 136 of arm 126, a camming surface 138 is provided. A lever 140 is journaled on pin 142 mounted on fixed member 100. One end 144 of lever 140 is disposed under camming surface 138, and the opposite end of lever 140 comprises bifurcated arms 146, FIG. 4, that are secured to links 112.

At the opposite end 150 of rocker arm 126, clamp 25 is secured, FIG. 2.

When reset button 120 is depressed against spring 128, FIG. 5, camming surface 138 depresses end 144 of lever 140, which pulls arms 146 forward. Links 112 in turn pull collar 106 into housing 100, thereby dislodging balls 102 from their engagement with the housing and with drive member 50. Springs 45 and 46 force rod 40 and drive member 50 to return to their initial positions shown in solid lines, FIG. 2. Such rearward movement of drive member 50 could cause balls 72 to wedge between member 50 and housing 70. If that occurred, the automatic resetting of the piston would be prevented. However, collar 80 abuts against stop pins 94 so as to keep balls 72 away from their locking position on surface 74 whenever button 54 is in its rest position.

Thus, by the aforedescribed means, when reset button 120 is pressed, piston rod 40 automatically retracts to its initial position, without any further manual involvement on the part of the operator.

Simultaneously with the release of members 100 and 102, clamp 25 is pushed up, releasing tube C from support 18. The tube is manually removed and a new tube, filled with liquid to be metered, is inserted.

Alternatively, balls 72 and 102 can be replaced with cylindrical rollers, not shown, mounted in housings 70 and 100 on grooves inclined at the angle of inclination of surfaces 74 and 104, respectively.

It will be appreciated that the invention described provides means for automatically latching the piston rod in its advanced, liquid-metering position(s), preventing accidental rearward movement of the rod until reset means are deliberately activated. The reset means is activated whenever metering from the container is completed, including for example, after a single fraction is metered.

The invention has been described in detail with particular reference to preferred embodiments thereof, but it will be understood that variations and modifications can be effected within the spirit and scope of the invention.

What is claimed is:

1. A device for metering liquid from a container, comprising means for ejecting liquid from such container, said means including a piston rod mounted for movement along a first path from an initial position, in a forward direction toward said container for ejection of liquid, and away from said container in a reset direction toward said initial position, first biasing means for biasing said piston rod away from said container to said initial position, first one-way locking means operative against said first biasing means for preventing substantially all movement of said piston rod along said first path in said reset direction, said first locking means comprising a first member adapted to roll relative to the surface of said piston rod, and a second member adapted to wedge said first member towards said piston rod when moved in only one direction relative to said piston rod, and reset means for releasing said first one-way locking means, said reset means including moving means for moving said first member away from said second member of said first locking means, whereby actuation of said reset means allows said piston rod to automatically move towards said initial position under the influence of said first biasing means.

2. A device for metering liquid from a container, comprising means for ejecting liquid from such container, said means including a piston rod mounted for movement along a first path between an initial position and positions operative to eject liquid, first biasing means for biasing said piston rod away from said container and said operative positions to said initial position, movable actuator means couplable to said piston rod for moving said piston rod in incremental amounts against said biasing means, from said initial position to successive operative positions, said actuator means being mounted for reciprocation along a second path that is parallel to said first path, second biasing means for biasing said actuator means to move along said second path away from said container to a rest position, first one-way locking means for preventing movement of said piston rod by said first biasing means, along said first path away from said container, said first locking means comprising a first member adapted to roll relative to the surface of said piston rod, and a second member adapted to wedge said first member towards said piston rod when moved in only one direction relative to said piston rod, said locking means being operative when said actuator means is moving away from said container under the influence of said second biasing means, and reset means for releasing said first one-way locking means, said reset means including moving means for moving said first member away from second member of said first locking means, whereby actuation of said reset means allows said piston rod to automatically move towards said actuator means and to said initial position under the influence of said first biasing means.

3. A device as defined in claim 2, and further including second one-way locking means for operatively locking said piston rod to said actuator means only during movement of said actuator means towards said container against said second biasing means.

4. A device as defined in claim 3, and further including means for automatically unlocking said second one-way locking means when said actuator is in said rest position.

5. A device for metering liquid from a container, comprising means for ejecting liquid from such container, said means including a piston rod mounted for movement along a first path from an initial position, in a forward direction toward said container for ejection of liquid, and away from said container in a reset direction toward said initial position, first biasing means for biasing said piston rod away from said container to said initial position, first one-way locking means operative against said first biasing means for preventing substantially all movement of said piston rod along said first path in said reset direction, said first one-way locking means comprising a ball adapted to roll relative to the surface of said piston rod, and an annular housing encompassing said ball and surrounding an extension of said piston rod, said housing having an internal frusto-conical surface against which said ball bears, a plane tangent to said frusto-conical surface forming an inclined angle with respect to said piston rod extension, having a value between about 3° and about 20°, whereby said housing is adapted to wedge said ball towards said piston rod when moved in only one direction relative to said piston rod, and reset means for releasing said first one-way locking means, whereby actuation of said reset means allows said piston rod to automatically move towards said initial position under the influence of said first biasing means.

6. A device for metering liquid from a container, comprising means for ejecting liquid from such container, said means including a piston rod mounted for movement along a first path from an initial position, in a forward direction toward said container for ejection of liquid and away from said container in a reset direction toward said initial position, first biasing means for biasing said piston rod away from said container to said initial position, first one-way locking means operative against said first biasing means for preventing substantially all movement of said piston rod along said first path in said reset direction, reset means for releasing said first one-way locking means, and a support for such container and means for securing the container to said support, said reset means including means for simultaneously releasing said securing means with the release of said first one-way locking means, whereby actuation of said reset means allows said piston rod to automatically move towards said initial position under the influence of said first biasing means.

7. A device for metering liquid from a container, comprising means for ejecting liquid from such container, said means including a piston rod mounted for movement along a first path between an initial position and positions operative to eject liquid, first biasing means for biasing said piston rod away from said container and said operative positions to said initial position, movable actuator means couplable to said piston rod for moving said piston rod in incremental amounts against said biasing means, from said initial position to successive operative positions, said actuator means being mounted for reciprocation along a second path that is parallel to said first path, second biasing means for biasing said actuator means to move along said second path away from said container to a rest position, first one-way locking means for preventing movement of said piston rod by said first biasing means, along said first path away from said container, said first one-way locking means comprising a ball adapted to roll relative to the surface of said piston rod, and an annular housing encompassing said ball and surrounding an extension of said piston rod, said housing having an internal frusto-conical surface against which said ball bears, a plane tangent to said frusto-conical surface forming an inclined angle with respect to said piston rod extension, having a value between about 3° and about 20°, whereby said housing is adapted to wedge said ball towards said piston rod when moved in only one direction relative to said piston rod, and said locking means is operative when said actuator means is moving away from said container under the influence of said second biasing means, and reset means for releasing said first one-way locking means, whereby actuation of said reset means allows said piston rod to automatically move towards said actuator means and to said initial position under the influence of said first biasing means.

8. A device for metering liquid from a container, comprising a support for such container and means for securing the container to said support, means for ejecting liquid from such container, said means including a piston rod mounted for movement along a first path between an initial position and positions operative to eject liquid, first biasing means for biasing said piston rod away from said container and said operative positions to said initial position, movable actuator means couplable to said piston rod for moving said piston rod in incremental amounts against said biasing means, from said initial position to successive operative positions, said actuator means being mounted for reciprocation along a second path that is parallel to said first path, second biasing means for biasing said actuator means to move along said second path away from said container to a rest position, first one-way locking means for preventing movement of said piston rod by said first biasing means, along said first path away from said container, said locking means being operative when said actuator means is moving away from said container under the influence of said second biasing means, and reset means for releasing said first one-way locking means, said reset means including means for simultaneously releasing said container securing means with the release of said first one-way locking means.

9. A device as defined in claim 1 or 2, wherein said moving means includes a collar slidably mounted relative to said piston rod and within said second member, said collar including a slotted portion within which said first member is confined.

10. A device as defined in claim 1, 2, 5, 6, 7 or 8 and further including spring means for placing said first one-way locking means in an incipient locking condition relative to said piston rod.

* * * * *